United States Patent
Ghiringhelli

(10) Patent No.: US 9,909,554 B2
(45) Date of Patent: Mar. 6, 2018

(54) DEVICE AND METHOD FOR CONVERTING WAVE MOTION ENERGY INTO ELECTRIC POWER

(71) Applicants: Federico Ghiringhelli, Azzate (IT); Giuseppe Andrea Varlonga, Milan (IT)

(72) Inventor: Federico Ghiringhelli, Azzate (IT)

(73) Assignees: Federico Ghiringhelli, Milan (IT); Giuseppe Andrea Varlonga, Milan (IT)

( * ) Notice: Subject to any disclaimer, the term of this patent is extended or adjusted under 35 U.S.C. 154(b) by 68 days.

(21) Appl. No.: 15/103,944

(22) PCT Filed: Dec. 9, 2014

(86) PCT No.: PCT/EP2014/077091
§ 371 (c)(1),
(2) Date: Jun. 13, 2016

(87) PCT Pub. No.: WO2015/086625
PCT Pub. Date: Jun. 18, 2015

(65) Prior Publication Data
US 2016/0377047 A1 Dec. 29, 2016

(30) Foreign Application Priority Data
Dec. 11, 2013 (IT) .................. MI13A2064

(51) Int. Cl.
*F03B 13/10* (2006.01)
*F03B 13/12* (2006.01)
(Continued)

(52) U.S. Cl.
CPC .......... *F03B 13/20* (2013.01); *F03B 13/186* (2013.01); *F03B 13/1885* (2013.01);
(Continued)

(58) Field of Classification Search
USPC ............................................. 290/42, 50, 53
See application file for complete search history.

(56) References Cited

U.S. PATENT DOCUMENTS 3,930,168 A * 12/1975 Tornabene .......... F03B 13/1845
290/53
3,964,264 A * 6/1976 Tornabene ............ F03B 13/186
175/5

(Continued)

FOREIGN PATENT DOCUMENTS

GB 2480337 11/2011
WO 2006105778 10/2006

OTHER PUBLICATIONS

International Search Report and Written Opinion of the International Searching Authority PCT/EP2014/077091 dated Mar. 2, 2015.

*Primary Examiner* — Pedro J Cuevas
(74) *Attorney, Agent, or Firm* — Young & Thompson

(57) ABSTRACT

A device and a method for converting wave motion energy into electric power are described. The device includes at least one support structure and a support frame to connect the floating element to the support structure. A linear element of motive power mounted on the support frame is movable with respect to the floating element and transfers motion to a motion conversion and transmission unit that converts linear motion into rotary motion, which drives kinetic energy accumulation elements and one or more electric power generators. The motion conversion and transmission unit, the kinetic energy accumulation elements and the electric power generators are all incorporated in the floating element.

12 Claims, 7 Drawing Sheets

(51) Int. Cl.
  *H02P 9/04* (2006.01)
  *F03B 13/20* (2006.01)
  *F03B 13/18* (2006.01)
  *H02K 7/02* (2006.01)
  *H02K 7/18* (2006.01)
  *B60L 11/12* (2006.01)

(52) U.S. Cl.
  CPC ........... *H02K 7/025* (2013.01); *H02K 7/1853* (2013.01); *F05B 2240/93* (2013.01); *F05B 2240/931* (2013.01); *F05B 2250/36* (2013.01); *F05B 2260/4031* (2013.01); *F05B 2260/421* (2013.01); *F05B 2260/505* (2013.01); *Y02E 10/38* (2013.01)

(56) References Cited

U.S. PATENT DOCUMENTS

| | | | | |
|---|---|---|---|---|
| 4,232,230 A * | 11/1980 | Ames | ................... | F03B 13/1895 290/53 |
| 4,672,222 A * | 6/1987 | Ames | ................... | F03B 13/1895 290/53 |
| 7,029,339 B2 * | 4/2006 | Brach | ................... | B63H 5/125 114/269 |
| 7,352,073 B2 * | 4/2008 | Ames | ...................... | F03B 13/12 290/42 |
| 8,810,056 B2 * | 8/2014 | Ames | ...................... | F03B 13/18 290/42 |
| 9,016,055 B2 * | 4/2015 | Dragic | ................ | F03B 13/1855 290/42 |
| 9,018,812 B2 * | 4/2015 | Gimlan | ................... | H02K 7/025 310/67 A |
| 9,553,489 B2 * | 1/2017 | Stornes | .................... | F03B 13/10 |
| 2005/0121915 A1 * | 6/2005 | Leijon | ................. | F03B 13/1885 290/42 |
| 2008/0054640 A1 | 3/2008 | Olson | | |
| 2008/0210500 A1 * | 9/2008 | Walker | ................... | B60K 6/105 188/151 R |
| 2009/0072540 A1 | 3/2009 | Mccague et al. | | |
| 2012/0192784 A1 * | 8/2012 | Gimlan | ................... | H02K 7/025 116/200 |
| 2013/0106111 A1 * | 5/2013 | Stornes | .................... | F03B 13/10 290/53 |
| 2013/0140821 A1 | 6/2013 | Sapir | | |
| 2014/0077496 A1 * | 3/2014 | Gill Londono | ..... | F03B 13/1855 290/53 |
| 2015/0143932 A1 * | 5/2015 | Igarashi | ................. | B62D 37/06 74/5.4 |
| 2016/0315521 A1 * | 10/2016 | Gimlan | ................... | H02M 1/00 |

* cited by examiner

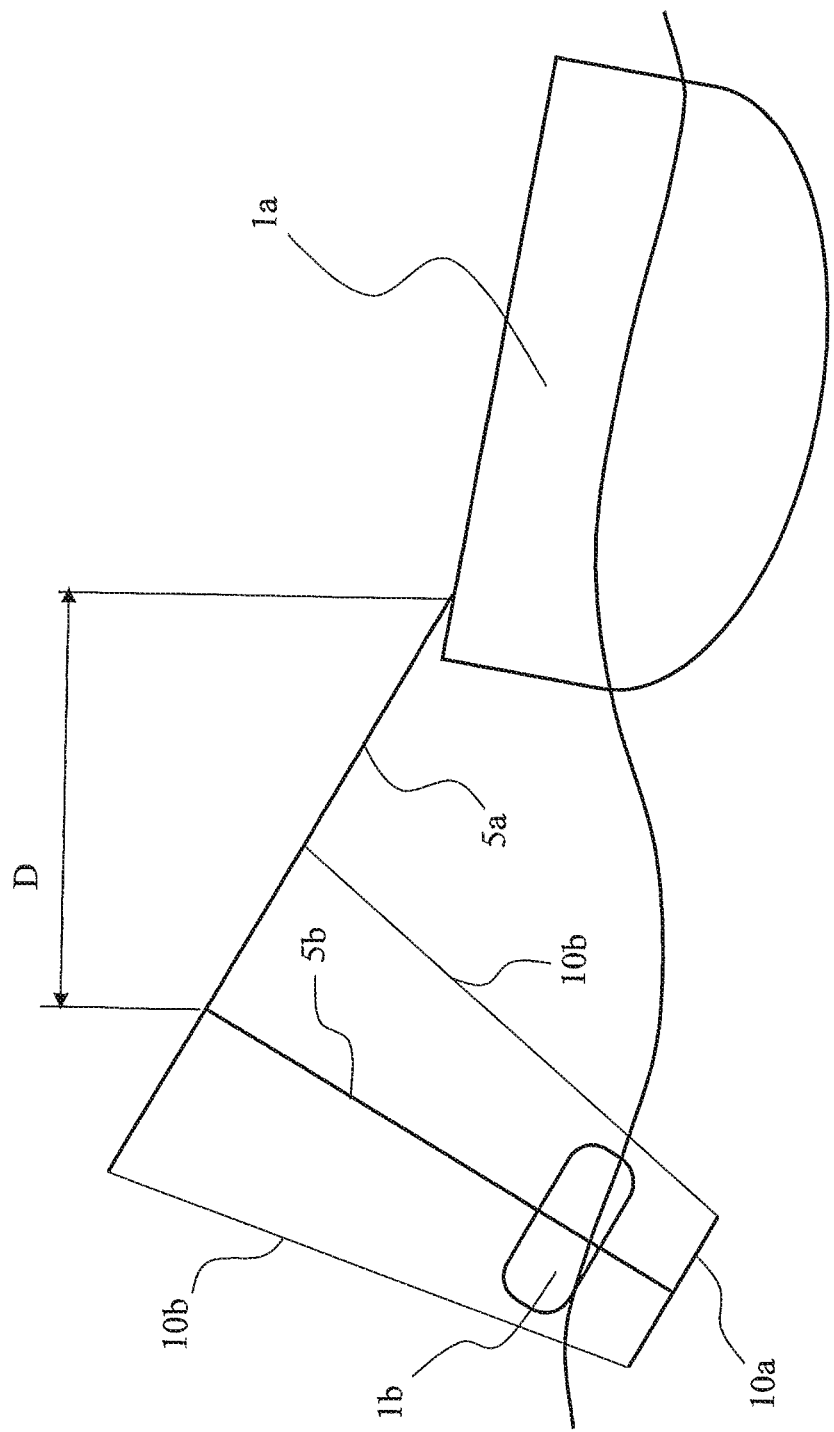

DEVICE AND METHOD FOR CONVERTING WAVE MOTION ENERGY INTO ELECTRIC POWER

TECHNICAL FIELD OF INVENTION

The present invention relates to a device and method for exploiting wave motion to produce electric power. As is known, the depletion of the planet's natural resources imposes development in the energy production field starting from so-called "renewable sources".

In addition to preserving natural resources, the possibility of producing "clean" electric power from alternative sources allows reducing the production of greenhouse gases, contributing to protecting the environment and reducing global warming.

STATE OF THE ART

In recent years, in addition to the traditional hydroelectric power stations that exploit the energy in bodies of water falling from natural or artificial reservoirs, various systems have become established for extracting energy from currents, tides and/or wave motion of the seas.

Some known systems of the WEC (Wave Energy Converter) type generally have a floating element that follows the harmonic motion of surface waves and which is thus set in motion by the latter in a reciprocating and substantially linear manner with respect to a fixed element.

A rack and pinion system is generically placed between the fixed and the floating element for transforming the linear reciprocating motion of the floating element into rotary motion of the pinion.

The rotary motion is then transmitted to an electric power generator. For example, known implementations of this type are described in US 2009/0072540A1.

Another solution is described in GB2480337 and comprises a floating element connected to a power accumulator arranged inside said floating element and movable with a different frequency with respect to that of the floating element, said power accumulator comprising a metal ring or rack with respect to which the pinions are coupled, to enable converting the linear motion (imparted by the floating element) into rotary motion of the pinions and with said floating element equipped with a mechanism for adjusting the orientation of the power accumulator with respect to said floating element.

The converter described in this document requires quite a large overall structure in order to provide electric power in appreciable quantities and is therefore almost exclusively suited for installation on fixed support structures. Furthermore, the single excursion of the floating element caused by the surface wave is rather limited and the conversion into electric power remains quite modest. Known systems therefore have insufficient practicality and efficiency to enable effective exploitation of surface wave motion.

SUMMARY OF INVENTION

The object of the present invention is a solution to the problems of the known art and, in particular, regards the production of a device for transforming surface wave motion into electric power that is reliable, simple to manufacture and of small size.

Another object of the present invention is to provide a device of the aforementioned type that is suitable for installation on floating structures or on fixed structures.

A further object of the present invention is to provide a device and a method that enable efficient production of electric power.

These and other objectives are achieved by the present invention by means of a device according to claim 1 and a method according to claim 11.

Particular uses of the present invention are described in claims 8 to 10.

Particular aspects of the present invention are defined in the respective dependent claims.

According to the present invention, a device for transforming wave motion into electric power comprises at least one floating element, at least one support structure and a support frame for connecting the floating element to the support structure.

The support frame comprises at least one hanger rod for a linear element of motive power and is movable with respect to the floating element.

The device also comprises a motion conversion and transmission unit capable of converting the linear motion into rotary motion, kinetic energy accumulation means and at least one electric power generator that can be operated directly or indirectly by the motion conversion and transmission unit.

The motion conversion and transmission unit, the energy accumulation means and the electric power generator (or electric power generators) are incorporated in the floating element.

Thanks to the present invention, the structure of the floating element is solid and compact, and once freed from the support frame, has all of its components housed internally.

The absence of projecting parts consequently facilitates transport and storage.

Moreover, since the means sensitive to the aggressive action of the marine environment are incorporated in the floating element, they are less subject to failure and malfunction due to an unfavourable working environment, thereby requiring less frequent maintenance.

According to a preferred aspect of the invention, the support structure is in turn floating. The combination of two floating parts, namely a first floating element, which incorporates the means of energy production, and the floating support structure, which is set in oscillation by the surface wave motion, has been found to be particularly advantageous.

The support frame is actually interposed between the motion conversion and transmission unit placed in the floating element and the floating support structure, which in this case is the main source of motion of the device described and consequently allows the relative motion to be amplified, in particular the useful stroke, between the motion conversion and transmission unit and the two floating elements, as will be explained hereinafter.

In general, the kinetic energy accumulation means enable absorbing sudden changes in the relative speed between the linear element of motive power and the motion conversion and transmission unit, so as to keep the rotational speed of the electric power generator substantially steady.

Preferably, the motion conversion and transmission unit is kinematically connected to both the kinetic energy accumulation means and the electric power generator. In other words, a kinematic chain is set up, whereby the motion conversion and transmission unit drives one or more flywheels that are, in turn, kinematically connected to one or more electric power generators.

According to one aspect of the invention, the kinetic energy accumulation means comprise two contrarotating flywheels coaxial with an axis parallel to the linear element of motive power.

The pair of contrarotating flywheels enables keeping the speed of the electric power generator substantially steady and, at same time, cancels the vector moments that act on the floating element, thus favouring stability in water.

The motion conversion and transmission unit typically comprises a pinion driven by the linear element of motive power; the latter can be chosen from a rack or chain.

As the relative motion between the linear element and the motion conversion and transmission unit is reciprocating, i.e. harmonic motion, it is preferable to arrange the kinematic decoupling means between the kinetic energy accumulation means and the motion conversion and transmission unit.

In other words, the pinion is moved by the rack or the chain according to a reciprocating motion.

However, the rotary motion transmitted to the electric power generator and to the flywheels must always be in the same direction.

To achieve this result, it is possible to make use of kinematic decoupling means, for example at least one unidirectional bearing between the motion conversion and transmission unit and the flywheels, in such a way that the movement of the flywheels can be alternatively constrained to or released from the motion conversion and transmission unit.

For example, by using just one unidirectional bearing along the kinematic chain, motion is only transmitted to the flywheels when the rack or chain moves in one of the two directions, while no motion is transmitted to the flywheels in the opposite direction.

Instead, if two unidirectional bearings are used, the motion generated by the rack or chain when they move in both directions can be transmitted to the flywheels.

The decoupling means could also intervene when the pinion turns more slowly than the flywheels, so as to prevent the pinion from braking the flywheels, with consequent transmission of a reduced quantity of kinetic energy to the electric power generator.

According to one aspect of the present invention, the support frame includes adjustable components so as to vary the relative distance between the support structure and the floating element.

At least one electric power generator can be of the reversible type, such that it can be used as a motor for initially setting the flywheels in rotation in the initial phases of using the device.

BRIEF DESCRIPTION OF DRAWINGS

Further characteristics and advantages of the present invention will become clear from the description that follows, made by way of non-limitative example and with reference to the accompanying drawings, where:

FIG. 1A is an enlarged view of a detail in FIG. 1;

FIGS. 6A and 6B schematically illustrate the principles of operation of a device according to the present invention.

WAYS OF IMPLEMENTING THE INVENTION

Figure 1:
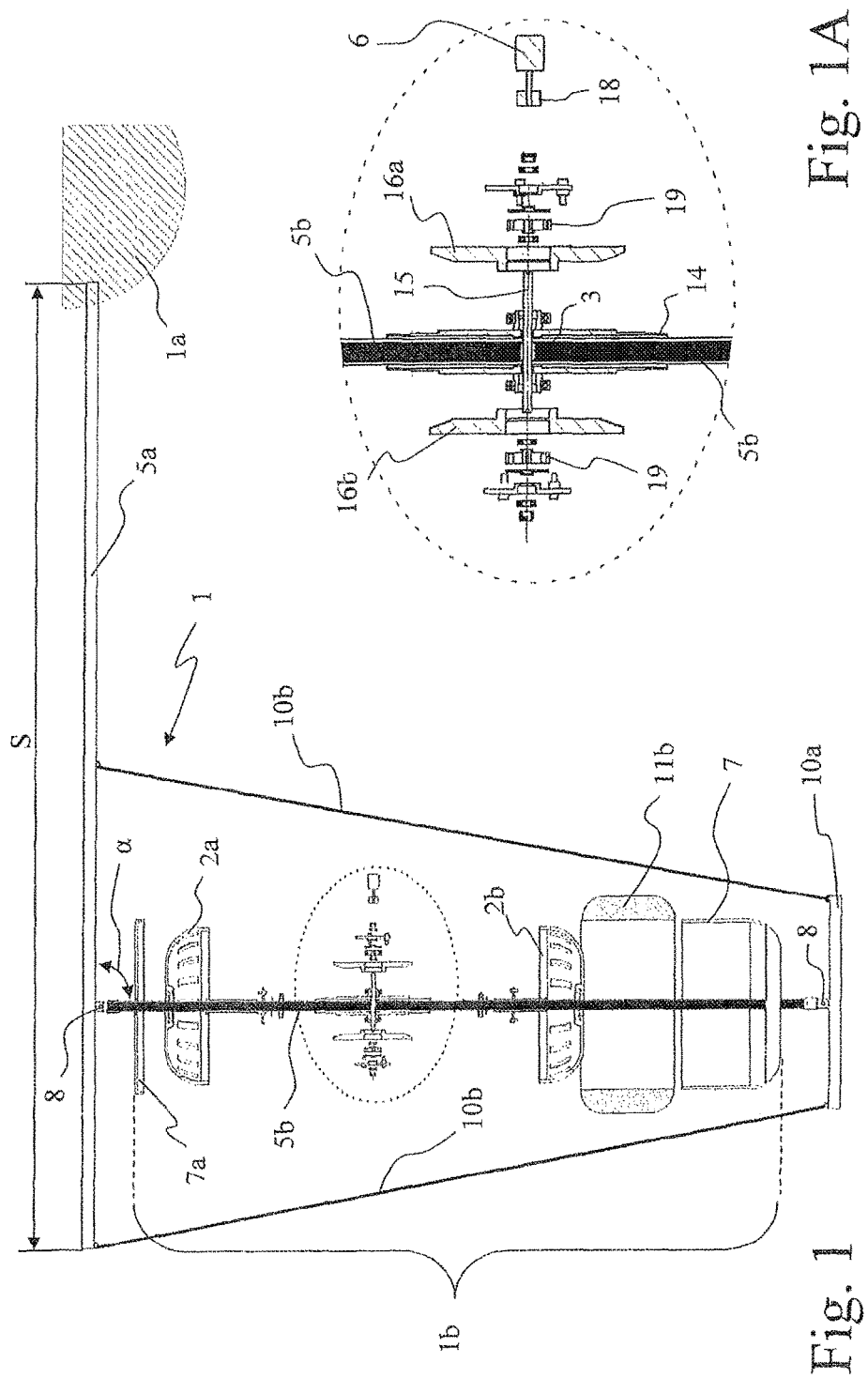
FIG. 1 is an exploded view, in elevation, of the components of a device according to a first embodiment of the present invention.
Figure 2:
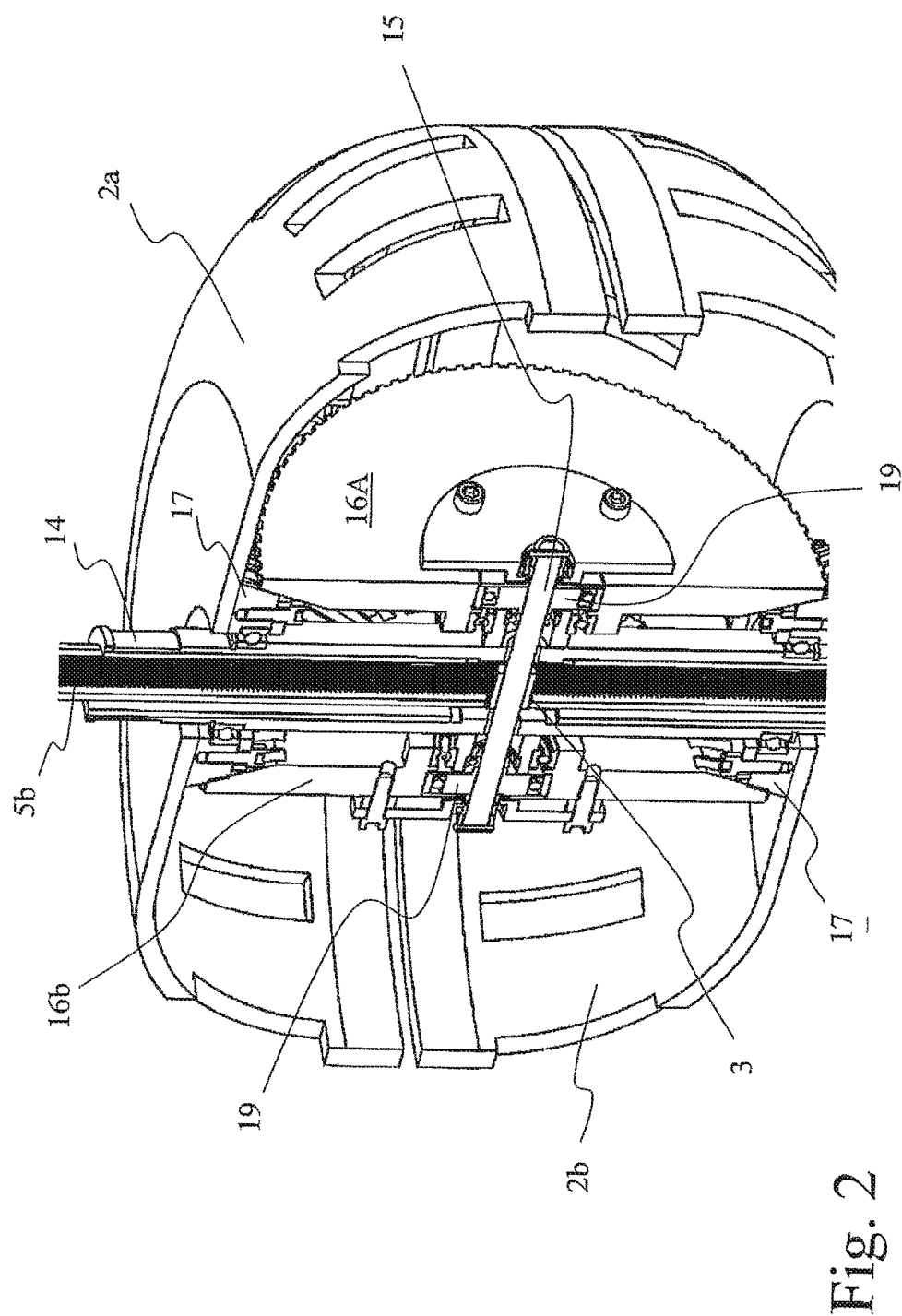
FIG. 2 is a cross-sectional perspective view of the components incorporated in the floating element in FIG. 1.
Figure 3:
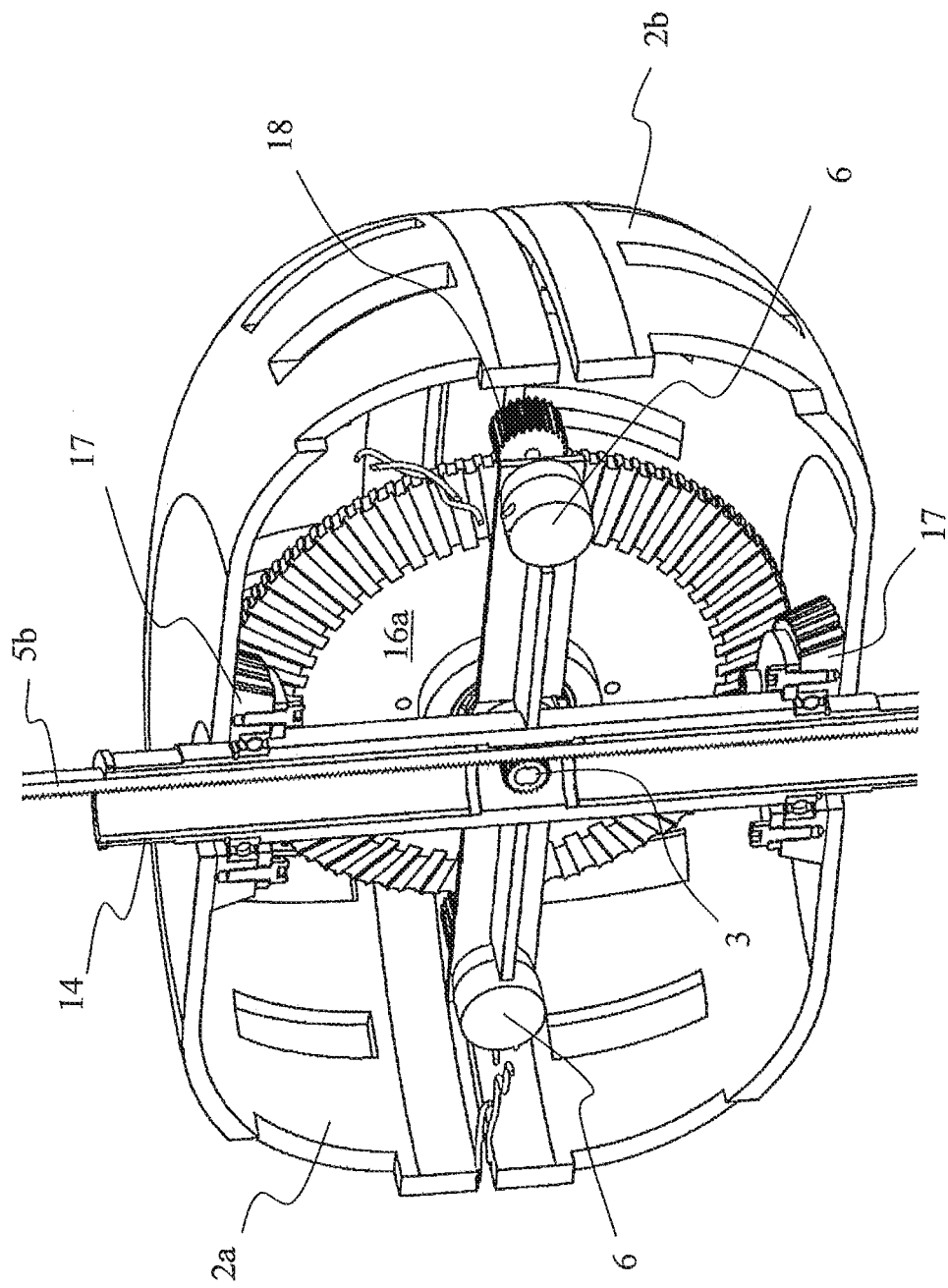
FIG. 3 is another perspective view of the components incorporated in the floating element in FIG. 1, seen in cross-section along a plane perpendicular to that in FIG. 2.

With initial reference to FIGS. 1-3, a device 1 according to a first embodiment of the present invention comprises, in general, a support structure 1a and a floating element 1b.

The support structure 1a and the floating element 1b are connected to each other by a support frame comprising a hanger rod 5a, a base element 10a and tie rods 10b.

A rack 5b, which constitutes the linear element of motive power in the embodiment described here, is hinged between the hanger rod 5a and the base element 10a on hinges 8.

The rack 5b can therefore turn with respect to the hanger rod 5a by an angle $\alpha$, limited by the degree of freedom provided by the hinges 8. This relative motion between the rack 5b and the hanger rod 5a enables following the variation of axis of the floating element 1b due to wave motion and/or the inclination taken by the floating element with respect to the water surface.

As well as being connected to the rack 5b by a hinge 8, the base element 10a is also connected to the hanger rod 5a by tie rods 10b provided, for example, in the form of cables.

In any case, the support frame constituted by components 5a, 10a and 10b enables limiting the relative movement between the rack 5b and the hanger rod 5a.

In fact, if a limited movement, especially in rotation, between the rack 5b and the hanger rod 5a is functional for the device 1, excessive freedom of movement between the two components could compromise the proper functioning of the device.

The rack 5b acts on a toothed pinion 3 to transform the linear motion into rotary motion that is then transmitted by mean of an opportune kinematic chain to a pair of flywheels 2a and 2b that are turned in opposite directions. As also revealed in FIGS. 1A, 2 and 3, the pinion 3 is mounted on a shaft 15 and rendered integral in rotation with the latter.

Alternatively, the pinion 3 could be obtained as part of the shaft 15.

Two bevel gears 16a and 16b are connected to the ends of the shaft 15 by bearings 19, at least one of which is of the unidirectional type to enable driving the respective gear 16a or 16b in only one direction of rotation.

In the case where both bearings 19 are of the unidirectional type, gear 16a (or 16b) is only driven in one direction with respect to the direction of rotation of the pinion 3, and vice versa, while no motive power is transmitted to the other gear 16b (or 16a) which therefore turns freely with respect to the pinion 3 and the shaft 15.

In practice, the unidirectional bearings 19 allow the flywheels 2a and 2b to always maintain motion in the same direction, independently of the reciprocating motion, typically a harmonic motion, of the pinion 3.

The flywheels 2a and 2b are advantageously arranged with the axis of rotation substantially parallel to the rack 5b and driven in opposite directions of rotation.

The contrarotating flywheels 2a and 2b enable stabilizing the position of the floating element in water because they generate opposite angular moments, which cancel out each other, thereby balancing the floating element 1b. To kinematically couple the flywheels 2a and 2b to the gears 16a and 16b, bevel gears 17, visible in FIGS. 2 and 3 in particular, are provided that are integral in rotation with the flywheels 2a and 2b and engage with the bevelled toothing of gears 16a and 16b.

One or more electric power generators 6 (FIG. 3) are driven by respective cogwheels 18, which are kinematically coupled to gears 16a and/or 16b on their peripheral toothing. Alternatively, the generators 6 can be kinematically coupled in a direct manner to the flywheels 2a and 2b.

At least one of the electric power generators 6 can be a reversible machine, namely an electric machine capable of functioning as a motor when supplied with electric power. This type of reversible generator can be used for first setting the flywheels 2a and 2b in rotation in the initial phases of using the device.

The transmission ratio provided for the coupling between the pinion 18 of the generator/motor 6 and the peripheral toothing 16a and/or 16b is such as to facilitate this particular function.

The flywheels 2a and 2b, the electric power generators 6 and the motion conversion and transmission unit are incorporated in the floating element 1b.

In particular, in the embodiment shown in FIG. 1, a housing 7 is constrainable to a floating body 11b of the floating element 1b and has an internal space capable of containing the accumulation means 2a and 2b, the electric power generator 6 and the motion conversion and transmission unit.

A closing element 7a, typically in the form of a lid, is constrainable to the housing 7 to ensure water tightness and can alternatively be made in one piece with the floating body 11b.

In general, the housing 7 houses the above-mentioned components and is provided with a pass-through aperture of an axial tube 14 for coupling with the rack 5b.

The pinion 3 is mounted in a rotatable manner, in a transversal position, inside the tubular element 14, which in turn has a transversal pass-through hole through which the shaft 15 passes.

Sealing means can be provided around the latter to avoid, or in any case limit, the passage of water to the components housed in the housing 7.

The support structure 1a, only schematically indicated in the figures, preferably floats and is set in oscillation by wave motion, so as to amplify the relative movement between the floating element 1b and the rack 5b due to the rod 5a that keeps them separated.

The support structure 1a can be, for example, an opportunely anchored boat, barge or pontoon. The floating body 11b of the floating element 1b is made of a material having a lower density than that of water. In particular, the density of the floating element is such as to allow floating in not only the "empty" condition, but also when the components of the floating element 1b are housed inside it.

Alternatively, the floating body 11 could even be made in the form of an inflatable air chamber, thereby further reducing storage space when the device is not used.

As disclosed, the support frame comprises a hanger rod 5a constrainable in an integral manner to the support structure 1a.

The hanger rod 5a has means of adjusting its position and orientation with respect to the support structure 1a.

The adjustment means enable varying at least the distance S that the hanger rod 5a projects with respect to the support structure 1a.

Once the desired adjustments for the arrangement of the hanger rod with respect to the support structure 1a have been made, specially provided constraints enable keeping the hanger rod 5a in position with respect to the structure 1a with the desired orientation.

The constraint to the support structure 1a may also have at least one degree of freedom, for example, to automatically adapt the orientation of the device with respect to wave motion.

Figure 4:
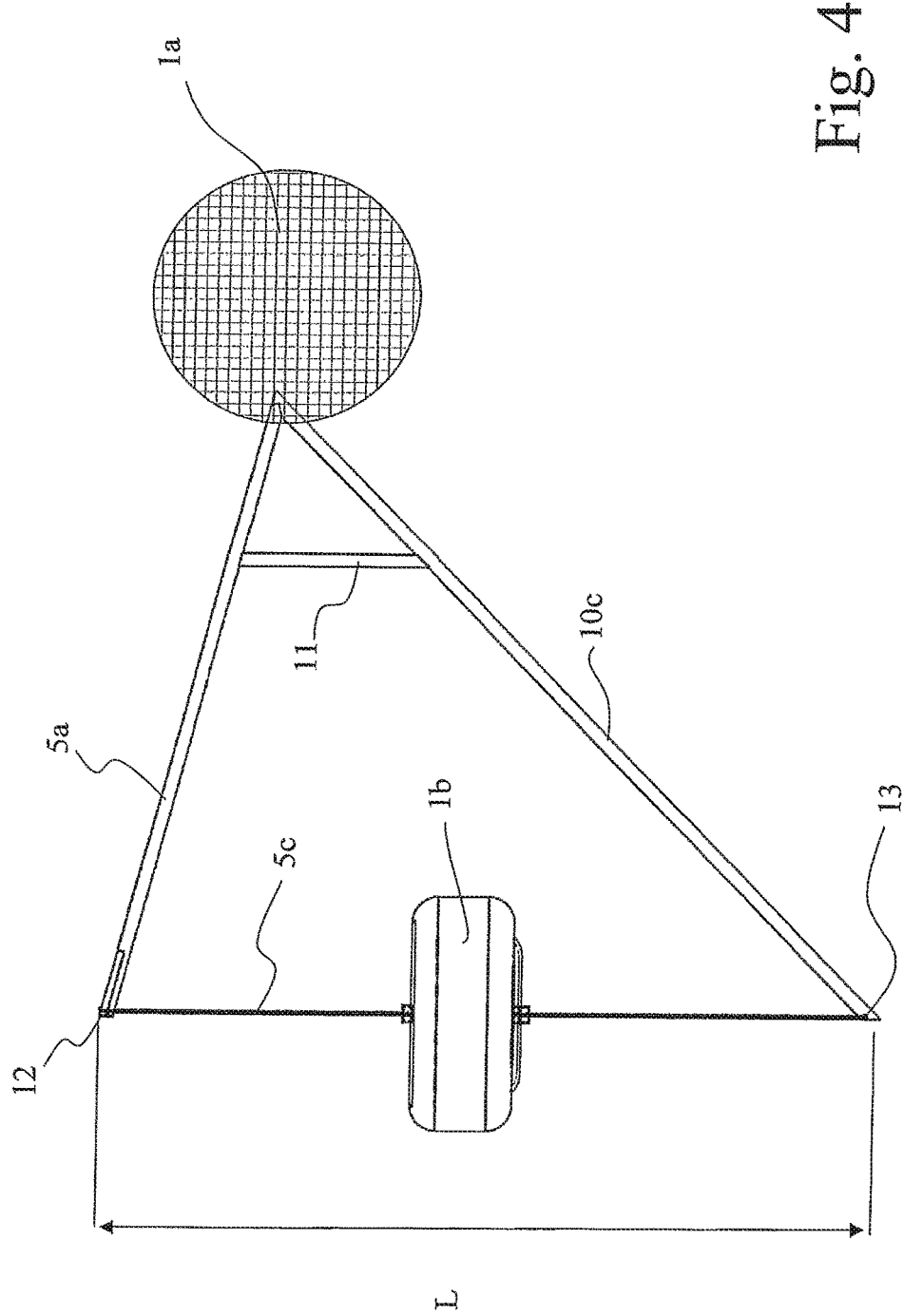
FIG. 4 is a schematic view of another embodiment of a device according to the present invention.
Figure 5:
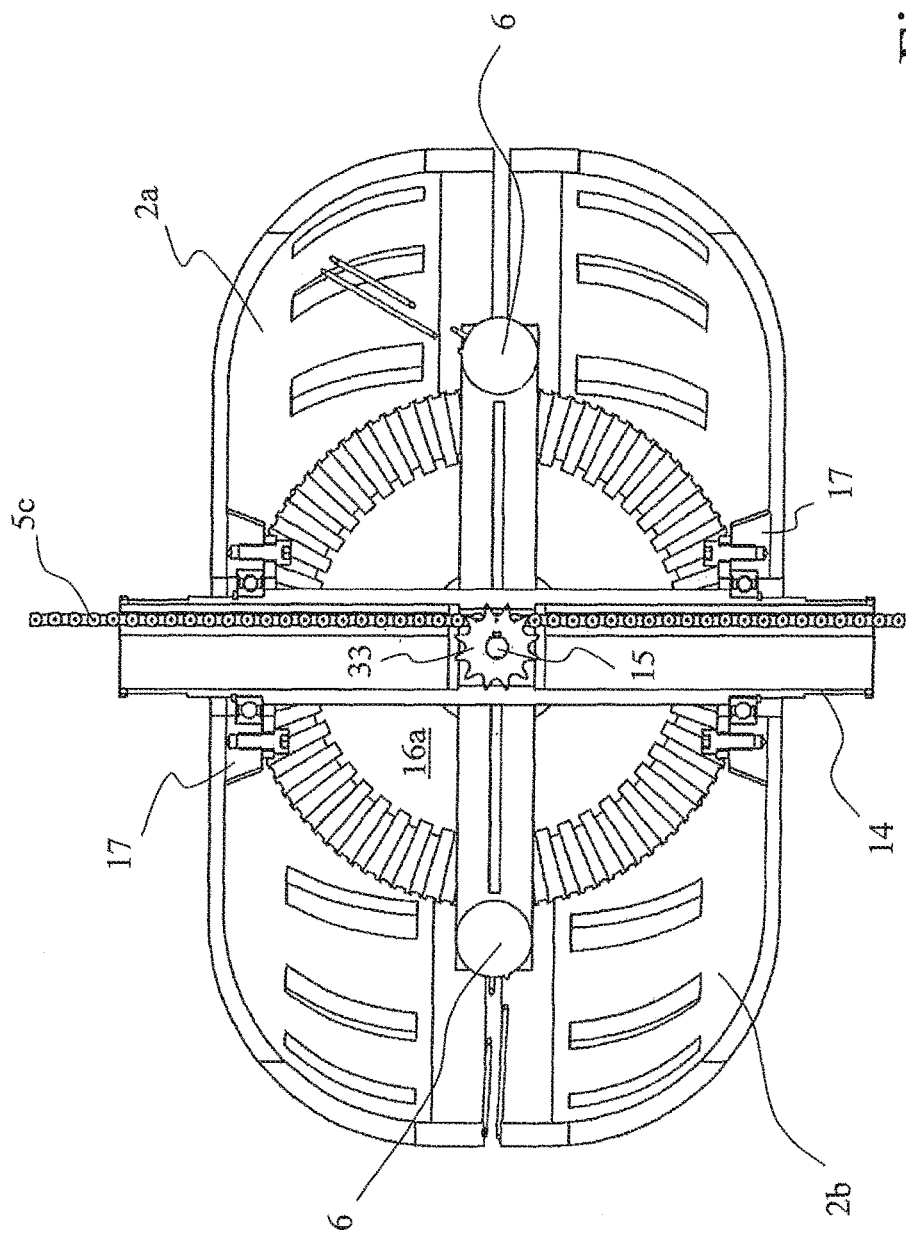
FIG. 5 is a cross-sectional perspective view of the components incorporated in the floating element in FIG. 4.

In the embodiment in FIGS. 4 and 5, the linear element of motive power comprises a chain 5c, namely a linear element provided with a certain flexibility that can be constrained to the hanger rod 5a.

With respect to the previously described embodiment, a certain degree of relative rotation between the chain 5c and the hanger rod 5a can be provided by the flexibility of the chain, thereby making the constraint via one or more hinges superfluous.

For example, the upper end 12 of the chain 5c could be constrained to the hanger rod 5a by means of an eye or similar that ensures limited freedom of rotation with respect to the rod 5a.

As shown in FIG. 4, the support frame comprises a further rod 10c to which the lower end 13 of the chain 5c is constrained to maintain a minimum level of tension on the chain 5c.

A reinforcement strut 11 can be advantageously placed between the rods 5a and 10c to provide the support frame with more solidity and ensure the correct tension on the chain 5c.

Rod 10c can be constrained to the hanger rod 5a, or directly to the support structure 1a.

In the embodiment shown in FIG. 5, components identical to those of the embodiment in FIGS. 2 and 3 are identified by the same reference numerals.

In addition to using a chain 5c instead of the rack 5b, movement is transmitted to a toothed pinion 33 integral in rotation with the shaft 15.

The operation of a device according to the invention is now described with reference to FIGS. 6A and 6B.

The layout used in these figures is that of the embodiment described in FIGS. 1-3, although it is evident that the same principles are similarly applicable to the embodiment in FIGS. 4 and 5.

The wave motion of the sea (or a lake, a river or similar) sets the floating support structure 1a in oscillation and, in consequence, the support frame 5a, 10a and 10b.

In general, the wave motion causes a relative movement between the rack 5b and the floating element 1b.

Figure 6B:
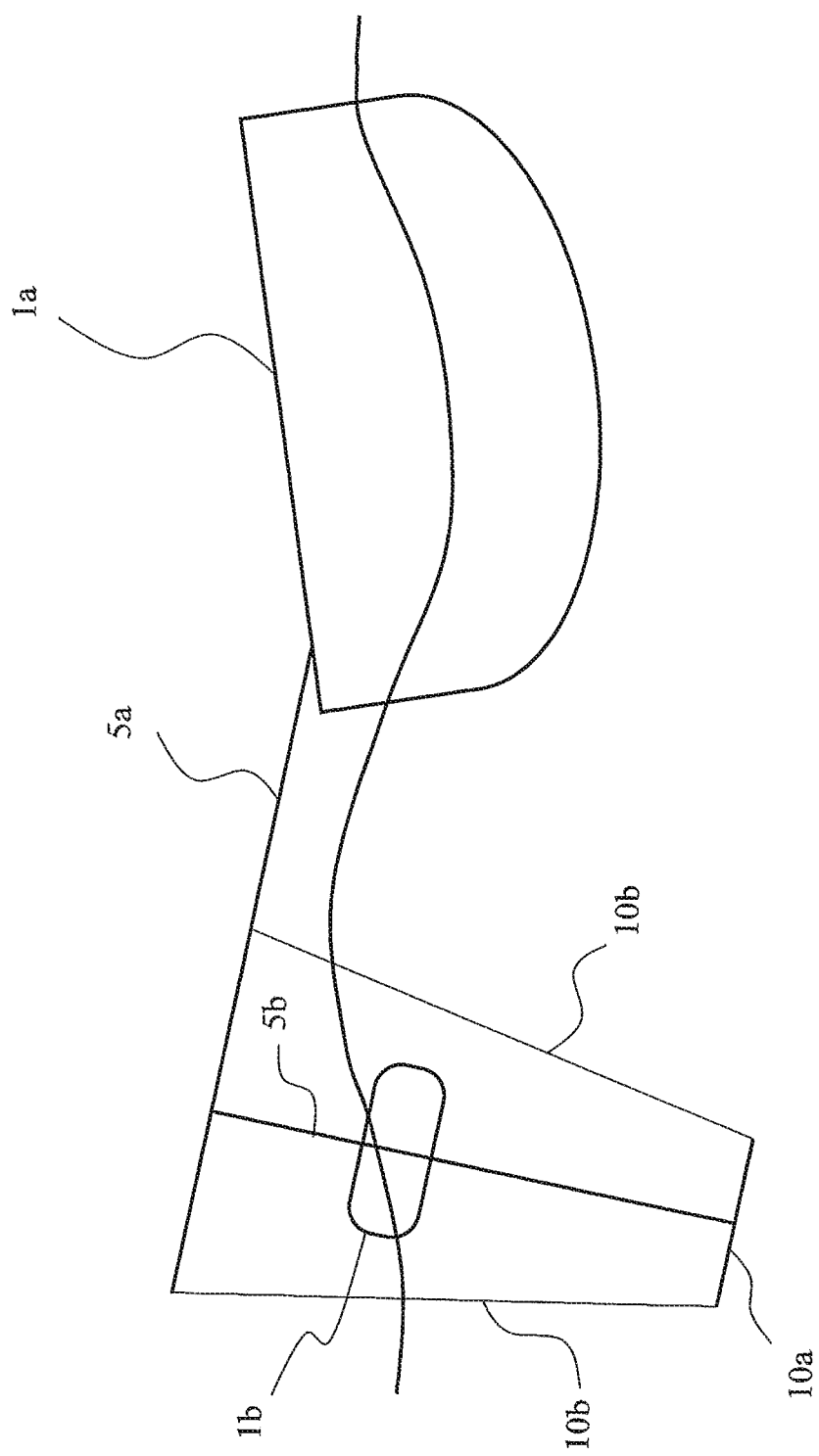

It is assumed to pass from the position in FIG. 6A to that in FIG. 6B. Taking the internal components with the orientation in FIG. 3 as reference, the rack 5b is subjected to a downward relative motion with respect to the floating element 1b.

The downward movement of the rack 5c causes a clockwise rotation of the pinion 3 that, in turn, causes a clockwise rotation of the shaft 15. The rotation of the shaft 15 is transmitted to gear 16a, which in turn rotates in a clockwise direction, by means of the unidirectional bearing 19.

The rotation of gear 16a is in turn transmitted to the flywheels 2a and 2b by means of the bevel gears 17 integral therewith, causing their rotation in different directions.

However, bevel gears 17 are also connected to bevel gear 16b (see FIG. 2), which is set in rotation in the opposite direction to gear 16a, namely in the anticlockwise direction.

The unidirectional bearing 19 consequently decouples the anticlockwise rotation of gear 16b with respect to the clockwise rotation of the shaft 15. The generators 6 are then set in rotation, always in the same direction, by the two gears 16*a* and 16*b* by means of the cogwheels 18 (FIG. 3).

When the device reaches position 6B, the oscillation of the support structure 1*a* and/or the motion of the floating element 1*b* reverse, so as to return to the position in FIG. 6A.

Around the dead point, i.e. in the passage between the downward motion and upward motion of the rack 5*b* with respect to the floating element 1*b*, the relative motion between the two elements is very small and the pinion 3, together with the shaft 15, rotate at low speed.

The unidirectional bearings 19 then decouple the movement of the shaft 15 from the rotation of gears 16*a* and 16*b*.

At this point, gears 16*a* and 16*b* are drawn in rotation by the flywheels 2*a* and 2*b*, which tend to keep their kinetic energy substantially unchanged or, in other words, tend to lose kinetic energy over a relatively long period of time by inertia.

Therefore, gear 16*a* continues its clockwise rotation, while gear 16*b* continues its anticlockwise rotation.

When the rack 5*b* moves upwards, the pinion 3 and the shaft 15 are instead subjected to anticlockwise rotation.

In this way, the anticlockwise rotation of the shaft 15 is now in the same direction with respect to the rotation of gear 16*b*, the unidirectional bearing 19 coupling the elements in rotation in such a way that the anticlockwise rotation of the shaft 15 drives gear 16*b*.

Instead, the rotation of gear 16*a* remains clockwise and decoupled from the rotation of the shaft 15.

When the position in FIG. 6A is reached, the cycle starts again.

In the case described above, the two unidirectional bearings thus act in mutual exclusion on one or the other of gears 16*a* and 16*b*.

In the case where only one unidirectional bearing 19 is present that connects only one of the gears 16*a* or 16*b* to the shaft 15, the rack 5*a* will transmit thrust in one direction only, while in the opposite direction an idle stroke of the rack 5*b* will be obtained, i.e. without thrust on gear 16 or 16*b*.

In short, the gears 16 and 16*b* and the flywheels 2*a* and 2*b* keep their own direction of rotation in both the phase of relative downward movement of the linear element 5*b* or 5*c* and in its relative upward movement.

Furthermore, due to the inertia of the system and of the flywheels 2*a* and 2*b* in particular, the speed of gears 16*a* and 16*b* and the flywheels 2*a* and 2*b* remains substantially constant.

The distance D between the constraint of the rack 5*b* on the hanger rod 5*a* and the support structure 1*a* amplifies the excursion of the oscillatory movement of the rack 5*b* with respect to the oscillation of the support structure 1*a*. The greater the distance D, the greater will be the useful stroke of the rack 5*b* with respect to the floating element 1*b* and, in consequence, the greater will be the quantity of kinetic energy to transform into electric power on each oscillation. It is therefore evident that a larger distance D means a larger force applied to the floating element 1*b* due to the longer arm applying force, as well as in increase in weight and fragility of the support frame 5*a* and 5*b*.

Length D must therefore be set as the best compromise between the above-mentioned factors.

A further element that affects the optimal choice of length D is the distance between two successive wave crests.

In particular, as wave motion moves both the support structure 1*a* and the floating element 1*b*, it is preferable to adjust distance D in such a way that a raising of the floating element 1*b* corresponds to a thrust movement of the support structure 1*a*, so as to increase the relative movement between these two elements.

In turn, the rotation of the cogwheel 18 fitted on the shaft of each of the generators 6 therefore remains always constant and in the same direction.

Each electric power generator 6 transforms the kinetic energy of the cogwheel 18 into electric power.

However, at least one of the generators 6 can also be a reversible electric machine capable of functioning as a motor to set the flywheels in movement.

The electric power generators 6 can be connected to the electrical system of the boat that acts as the floating support structure 1*a*, for example, for supplying power to the electrical systems and provide a charge for the onboard accumulators. Alternatively, a number of devices could be installed on a barge or floating pontoon, which in this case constitutes the support structure 1*a*, to provide power for remote users.

The electrical connection can be implemented, for example, by extendable conductor cables that run from each of the floating elements 1*b* to the support structure 1*a*.

Various modifications can be made to the embodiments described herein without departing from the scope of the present invention.

For example, the shape and placing of the flywheels 2*a* and 2*b* could be changed with respect to that shown, just as the number of flywheels could be more than the two shown.

Furthermore, the gears 16*a* and 16*b* could also act as means of kinetic energy accumulation, rendering the presence of the flywheels 2*a* and 2*b* superfluous or further reducing their bulk.

The unidirectional bearings 19 described here, or other suitable means of kinematic decoupling, could also be arranged between the flywheels 2*a* and 2*b* and the bevel gears 17.

It is also evident that different support frames could be used with the present invention.

For example, the support frame of the embodiment in FIGS. 1-3 could also be used with a chain 5*c*, as long as struts are provided instead of the tie rods 10*b*, namely elements capable of also offering a certain resistance in compression as well as in traction, so as to maintain a minimum length for the chain.

Instead of floating, the support structure could also be constituted by a fixed structure, such as, for example, a reef, a quay or a platform, so as exploit just the surface waves without the contribution resulting from installation on a floating structure.

The invention claimed is:

1. A device (1) for converting wave motion into electric power, comprising at least one floating element (1*b*), at least one floating support structure (1*a*) and a support frame to connect said floating element to said support structure, said support frame comprising at least one hanger rod (5*a*) supporting a linear element of motive power and being movable with respect to said floating element, the device further comprising a motion conversion and transmission unit that converts linear motion into rotary motion and at least one electric power generator that can be operated directly or indirectly by said motion conversion and transmission unit, wherein the device comprises means of kinetic energy accumulation and stabilization of the position of the floating element (1*b*) in water, defined by at least two contrarotating flywheels (2*a*, 2*b*) coaxial with an axis parallel to the linear element of motive power and incorporated together with said motion conversion and transmission unit and said at least one electric power generator in said floating element (1*b*), arranged at an adjustable distance with respect to said support structure (1*a*) along said hanger rod (5*a*) fastened to and integral with said support structure (1*a*).

2. A device according to claim 1, wherein said at least two flywheels (2*a*, 2*b*) are kinematically connected, directly or indirectly, to said motion conversion and transmission unit.

3. A device according to claim 1, wherein said linear element of motive power comprises a rack (5*b*).

4. A device according to claim 1, wherein said linear element of motive power comprises a chain (5*c*).

5. A device according to claim 1, wherein kinematic decoupling means are provided to decouple said motion conversion and transmission unit from said kinetic energy accumulation means.

6. A device according to claim 1, wherein said support frame comprises adjustable elements to vary the relative distance between said support structure (1*a*) and said floating element (1*b*).

7. A device according to claim 1, wherein said at least one electric power generator is of the reversible type.

8. The device according to claim 1, wherein said floating support structure (1*a*) is a boat, and the generated electric power is supplied to the boat.

9. The device according to claim 1, wherein said floating support structure (1*a*), is a barge or floating pontoon, and the generated electric power is delivered to one or more remote users.

10. The device according to claim 1, wherein the device is installed on a fixed support structure (1*a*), and the generated electric power is delivered to one or more remote users.

11. A method for converting wave motion into electric power by means of at least one device according to claim 1, which comprises the steps of:
   a. installing said at least one device on a floating support structure (1*a*);
   b. putting the floating element (1*b*) of said at least one device in water;
   c. adjusting the elements of the support frame of said at least one device to move it away and keep it at a distance from said support structure (1*a*).

12. A method according to claim 11, wherein the adjustment of the distance in said step c is carried out according to the length between two consecutive wave crests.

\* \* \* \* \*